United States Patent [19]

Hester et al.

[11] Patent Number: 4,775,927

[45] Date of Patent: Oct. 4, 1988

[54] PROCESSOR INCLUDING FETCH OPERATION FOR BRANCH INSTRUCTION WITH CONTROL TAG

[75] Inventors: Phillip D. Hester, Austin; William M. Johnson, Leander, both of Tex.

[73] Assignee: International Business Machines Corporation, Armonk, N.Y.

[21] Appl. No.: 666,790

[22] Filed: Oct. 31, 1984

[51] Int. Cl.⁴ .................................... G06F 12/02
[52] U.S. Cl. .................................... 364/200
[58] Field of Search ... 364/900 MS File, 200 MS File

[56] References Cited

U.S. PATENT DOCUMENTS

| | | | |
|---|---|---|---|
| 4,155,120 | 5/1979 | Keefer et al. | |
| 4,179,737 | 12/1979 | Kim | |
| 4,348,724 | 9/1982 | Cushing et al. | |
| 4,360,868 | 11/1982 | Retter | |
| 4,409,654 | 10/1983 | Wada | 364/200 |
| 4,430,706 | 2/1984 | Sand | |
| 4,435,756 | 3/1984 | Potash | 364/200 |
| 4,471,433 | 9/1984 | Matsumoto | 364/200 |

OTHER PUBLICATIONS

IBM TDB vol. 24, No. 10, Mar. 1982, pp. 4986 to 4987, "Synchronous LSSD Packet Switching Memory and I/O Channel", by Jeremiah et al.
IBM TDB vol. 25, No. 3B, Aug. 1982, pp. 1771 to 1772, "Exact Interrupt Capability for Processors Using a Packet-Switching Storage Channel", by Hester et al.

Primary Examiner—Archie E. Williams, Jr.
Assistant Examiner—Emily Y. Chan
Attorney, Agent, or Firm—J. F. Villella, Jr.; Thomas E. Tyson

[57] ABSTRACT

A method and apparatus expands the capability of an instruction prefetch buffer. The method and apparatus enables the instruction prefetch buffer to distinguish between old prefetches that occurred before a branch in an instruction stream and new prefetches which occurred after the branch in the instruction stream. A control tag is generated each time a request for an instruction is sent to a storage. The returning instruction has appended thereto the original control tag which is then compared to the current value of control tag in the instruction prefetch buffer. If the two values match, then this is an indication that a branch has not occurred and the instruction is still required. However, if the two values of the control tag are not equal, then this is an indication that a branch in the instruction stream has occurred and that the instruction being sent from storage to the buffer is no longer required. The method and apparatus are also applicable to the use of branch-with-execute instructions wherein a subject instruction is executed immediately following the branch-with-execute instruction. The execution of this subject instruction before the branch target instruction enables the system processor to continue operating while it is waiting for the branch target instruction.

10 Claims, 7 Drawing Sheets

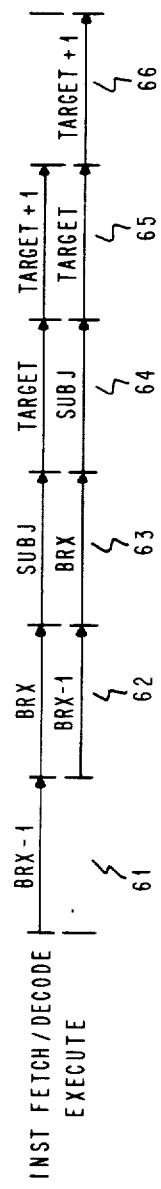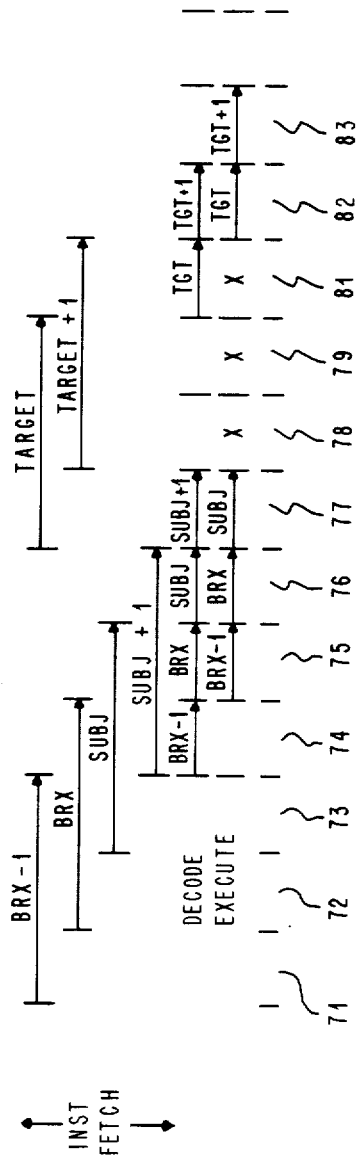

PROCESSOR INCLUDING FETCH OPERATION FOR BRANCH INSTRUCTION WITH CONTROL TAG

DESCRIPTION

1. Technical Field

This invention relates to the operation of an instruction prefetch buffer in a pipelined processor, and more particularly to the execution of branch and branch-with-execute instructions.

2. Background Art

In a pipelined processor, multiple pieces of data, such as instructions, can move simultaneously through the channel connecting the processor with a storage means. A storage controller is used to direct such data between the storage means and the processor through the storage channel. The data moving through the channel is tagged so as to identify its destination in the processor. Since the operation of the processor is much faster than that of the storage means, the use of such a pipelined storage channel together with appropriate buffers within the processor permits the processor to operate at its most effective rate and to conduct a plurality of simultaneous storage transactions. The concept of a pipelined storage channel is described in *IBM Technical Disclosure Bulletin* article, "Synchronous LSSD Packet Switching Memory and I/O Channel", published March 1982, pages 4986-4987 by Jeremiah et al, and in *IBM Technical Disclosure Bulletin* article, "Exact Interrupt Capability for Processors Using a Packet-Switching Storage Channel", published August 1982, pages 1771-1772 by Hester et al.

Instructions in such a pipelined processor are usually fetched several cycles in advance of their execution. This increases processor performance by allowing instruction accessing to be overlapped with instruction execution. A problem arises, however, whenever a successful branch instruction is encountered. A successful branch invalidates all instructions which have been prefetched since they are part of an old instruction stream. During the time that the processor is waiting to access the new instruction stream for the branch, it is essentially idle. This idle time decreases the overall performance of the processor.

A further problem that arises as a result of a branch is that the instruction prefetch buffer in the processor has no advance knowledge of a successful branch, so there may be several pending requests from previous prefetches when the successful branch occurs. The problem then is how to distinguish between old prefetches, i.e., ones that occurred before the successful branch and which are no longer necessary, and the new prefetches which are needed as a result of the successful branch.

One approach to solve this branching problem is to divide the instruction prefetch buffer into two halves, and to alternate between the two halves every time a successful branch occurs. Since the storage channel utilizes a tag to identify each request source, a set of tags could be associated with each half of the instruction prefetch buffer. Thus, whenever a successful branch occurs, the instruction prefetch buffer would change to the alternate set of tags. In this manner, the instruction prefetch buffer could determine whether or not a reply from a prefetch request should go into the active half of the buffer by comparing the returned tag with the currently active tag set. If the tag were a member of the active set, then the prefetch would be associated with the current execution stream and consequently should be placed in the active half of the buffer. Conversely, if the tag were not a member of the active set, then it would no longer be required and could be placed in the inactive half of the buffer. Although this approach is workable, it only utilizes one-half of the storage area in the instruction prefetch buffer at any given time.

One technique for overcoming the branching problem is disclosed in U.S. Pat. No. 4,430,706, wherein a branch prediction approach is employed. In this approach, an auxiliary implementation is added to a pipelined data processor for monitoring both the instruction flow and the recent conditional branches and their outcome. Whenever a branch instruction is encountered more than once, its prior behavior is used to predict the particular branch to be taken. The processor then provisionally executes the instructions in such predicted branch. However, when a predicted branch turns out to be incorrect, such processing ceases and the processor then attempts to take a correct branch. Two problems with this approach are that, first, extra hardware is required, and second, processing time is wasted whenever a wrong branch is predicted and subsequently processed.

Another approach to the branching problem is disclosed in U.S. Pat. Nos. 4,155,120 and 4,179,737, wherein it is assumed that no branching possibilities are present. In accordance with this approach, microinstruction sequencing is assumed to be unconditional even though a plurality of branching possibilities may indeed exist in the microinstruction sequencing flow. In this manner, microinstruction sequencing may proceed rapidly as long as no branching occurs. However, when a branch does in fact occur, it must be detected and then a correction cycle must be initiated. A problem with this approach is that as the number of branching operations increases, sequencing must be altered and corrected for incorrect sequencing because of lack of recognition of branching possibilities. Further this approach requires means for monitoring the correctness of the sequencing of microinstructions concurrently with the execution of microinstructions during each cycle for which a branching decision is required.

Still another approach to reducing performance degradation due to branching is to introduce a set of branch-with-execute, also known as delayed branch, instructions. These instructions are defined such that the next sequential instruction following the branch instruction is executed prior to the execution of the branch target instruction. This next sequential instruction is known as the subject instruction. The subject instruction usually has already been fetched at the completion of the branch-with-execute instruction, and consequently, the processor executes it instead of remaining idle while waiting for the branch target fetch to be completed.

The branch-with-execute approach is relatively easy to implement on a processor which has a single instruction prefetch buffer. The processor executes the subject instruction which is being fetched and decoded while the branch-with-execute instruction is executing. In a normal branch, the processor would ignore the subject instruction. However, the branch-with-execute approach becomes much more difficult to implement as the size of the instruction prefetch buffer increases.

DISCLOSURE OF THE INVENTION

Accordingly, it is an object of this invention to provide improved execution sequencing in a pipelined processor system.

It is another object of this invention to provide improved instruction prefetch buffer utilization and efficiency.

It is still a further object of this invention to provide improved branch and branch-with-execute instruction sequencing in an instruction prefetch buffer in a pipelined processor.

In accordance with these and other objects, there is disclosed a technique which allows an instruction prefetch buffer to appear to contain twice as many logical locations as physical locations. This technique reduces the amount of storage required in the instruction prefetch buffer (IPB) by a factor of two without reducing IPB performance. The technique is especially useful for handling branching operations. When a branch occurs, the IPB begins fetching instructions starting at the branch target address. However, since the IPB has no advance knowledge of the branch, there may be several pending requests from the previous prefetched instructions when the branch occurs. The technique disclosed herein enables the IPB to distinguish between old prefetches, that is, those that occurred before the branch, and the new prefetches which are needed as a result of the branch.

The IPB contains a plurality of registers which are used to hold instructions prior to their execution. Each of these registers has a number associated with it which uniquely identifies that register. Additionally, a control bit is associated with each register to indicate if there is a cancelled fetch outstanding (CFO) for that particular register. A cancelled fetch outstanding occurs after a branch when a previous fetch has not yet been returned to the IPB from storage over the storage channel. Recall that these previous prefetches are no longer required after the branch occurs. In addition to the register identifier and the CFO control bit, there is also a control bit in the processor which is complemented every time a branch occurs. This latter control bit is known as the branch target bit (BTB).

When a prefetch is returned to the IPB, the BTB value associated with the returning prefetch is compared to the current BTB value in the IPB. If the two are equal, then this is an indication that a branch has not occurred and that the prefetch request which was sent to storage is still needed. In this situation, the returning prefetch is written into the register in the IPB specified by control bits of the returning prefetch. The returned instruction is then used when needed for execution. However, if the BTB value associated with the returning prefetch is not equal to the current BTB value in the IPB, then this is an indication that a branch has occurred and that the returning prefetch is no longer needed. As a result, the returning prefetch is not written into one of the registers of the IPB.

Whenever a branch occurs, the CFO bits associated with each register of the IPB are examined. If any of such bits are set, then the branch must wait until all CFO bits are reset. As previously noted, the BTB is also complemented when the branch occurs. Finally, CFO bits in the IPB are set for locations for which a prefetch has been sent to storage but has not yet returned.

The preferred embodiment disclosed herein is also applicable to the operation of a pipelined processor using branch-with-execute instructions. The next sequential instruction following a branch instruction, which is known as the subject instruction, is executed before the branch target instruction is executed. The subject instruction usually has already been fetched at the completion of the branch-with-execute instruction, and consequently, the processor executes it instead of going idle while waiting for the branch target fetch to be completed.

When the branch-with-execute instruction is executed, the IPB decides which IPB location is to be used as the destination of the branch target fetch. The IPB allocates that particular location and determines whether or not the fetch of the subject instruction has begun. If such fetch has not begun, then the branch-with-execute instruction must be held off because it must modify the instruction address register which must be used in order to initiate the fetch of the subject instruction. At this time, the IPB frees all locations in the IPB not associated with the subject instruction and it also retains the IPB pointer to the subject instruction as well as the subject instruction itself. After the subject instruction has begun execution, the IPB frees the IPB location or locations associated with the subject instruction so that these locations may be used for prefetching. Finally, the IPB updates its pointer to point to the target instruction required.

BRIEF DESCRIPTION OF THE DRAWING

FIG. 6 is a time diagram showing the instruction fetching and decoding as well as the instruction execution for a normal branching operation.

FIG. 7 is a more detailed time diagram of instruction execution according to the present invention.

BEST MODE FOR CARRYING OUT THE INVENTION

Figure 1:
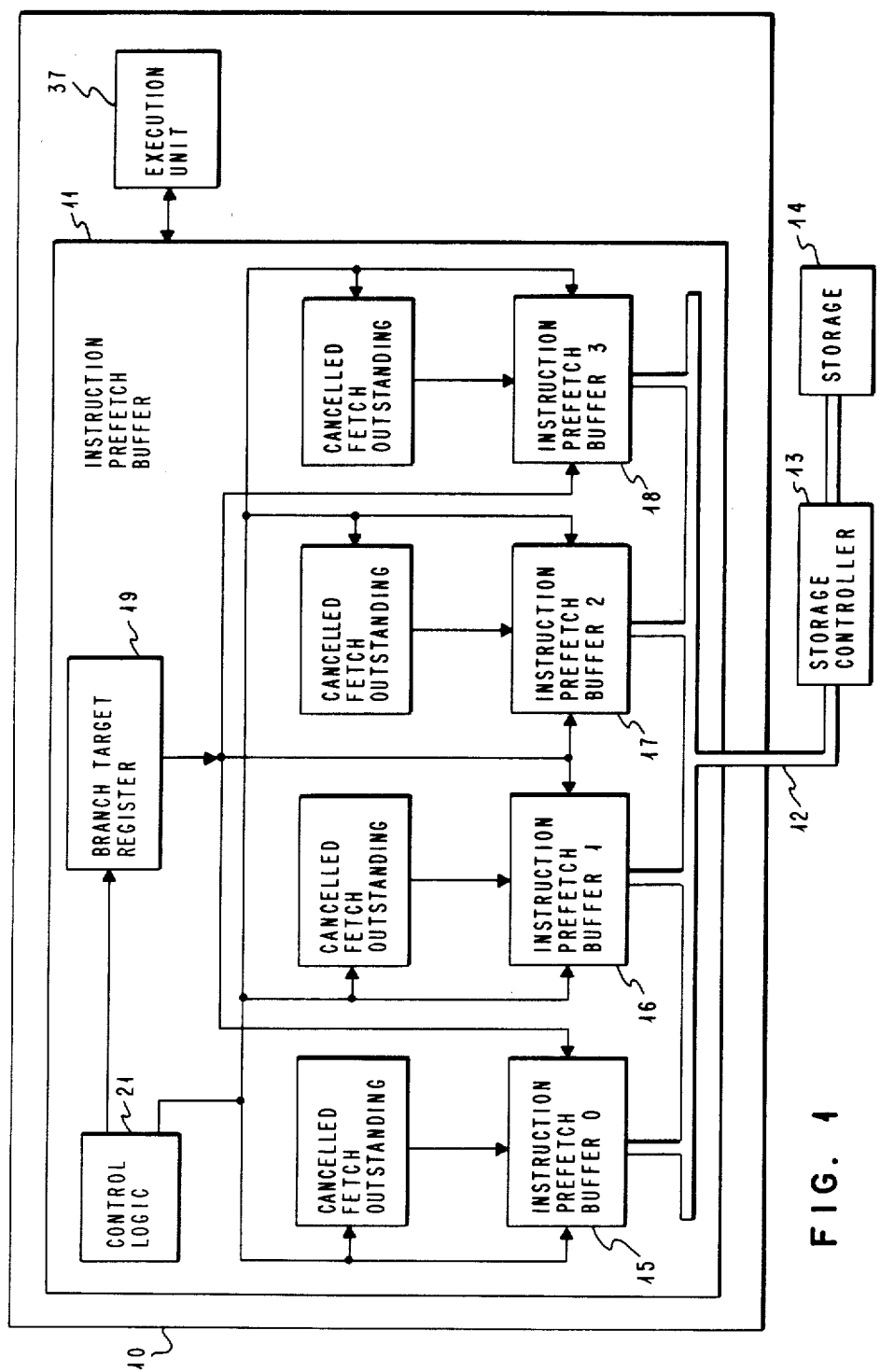
FIG. 1 is a block diagram of a pipelined processor system according to the present invention.

Referring now to FIG. 1, there is shown a pipelined processor with particular emphasis on instruction prefetch buffer 11. Information in the form of instructions is communicated over storage channel 12 through storage controller 13 between instruction prefetch buffer (IPB) 11 and storage 14. IPB 11 comprises four registers, IPB0, 15, IPB1, 16, IPB2, 17, and IPB3, 18. Each of registers 15 through 18 has logic means CFO, associated with it for indicating whether each of these registers has a cancelled fetch outstanding (CFO). IPB 11 also includes a branch tag register (BTR) 19 which contains a control bit for indicating whenever an instruction branch occurs. IPB 11 also contains control logic 21 for directing the fetching of instructions to and from IPB 11.

Each of registers 15 through 18 has a number associated with it, 0 through 3, which uniquely identifies such register. Additionally, there is a control bit associated with each of registers 15 through 18 to indicate if there is a cancelled fetch outstanding (CFO) for that associated register. There is also a control bit in BTR 19 called the branch target bit (BTB) which is complemented every time a branch occurs in the instruction stream.

In operation, whenever the next instruction is to be fetched, IPB 11 determines which of registers 15 through 18 should be used for the fetch. A tag is then generated for the prefetch so as to indicate the source of the instruction request. Control logic 21 generates this tag for the instruction fetch by appending the current BTB value to the register number selected for such request. The prefetch request is then sent to storage 14 over storage channel 12 in order to obtain the next instruction.

After the prefetch request has been processed by storage 14, it will be returned over channel 12 to IPB 11. The returned prefetch request will contain the next instruction along with its identifying tag. A determination will then be made if the returned prefetch instruction is still needed. This is done by comparing the BTB value in the returning instruction to the current BTB value in BTR 19. If the two values are equal, then this is an indication that a branch has not occurred since the time that the prefetch request was sent to storage 14. Consequently, the prefetch instruction is still required. At this time, the prefetch instruction returned is then written into the register specified by the returning tag identifier, and the instruction is then used when it is needed for an execution.

If the BTB value in the returning prefetch instruction and the current BTB value in BTR 19 are different, then this is an indication that a branch in the instruction stream has occurred. Consequently, the prefetch instruction is no longer needed and therefore, is not written in one of registers 15 through 18. The CFO bit associated with the returning prefetch instruction is then reset. At the time a branch in the instruction stream occurs, the CFO bits associated with each of registers 15 through 18 are examined. If any of these CFO bits are set, then the execution of the branch in the instruction stream must wait until all of these CFO bits are reset. Also at this time, the BTB in BTR 19 is complemented. Finally, control logic 21 examines each of registers 15 through 18 to determine if any prefetch has been sent to storage 14 but has not yet returned. If this is the case, then the CFO bit associated with that register is set thus indicating that there is a cancelled fetch outstanding.

Figure 2:
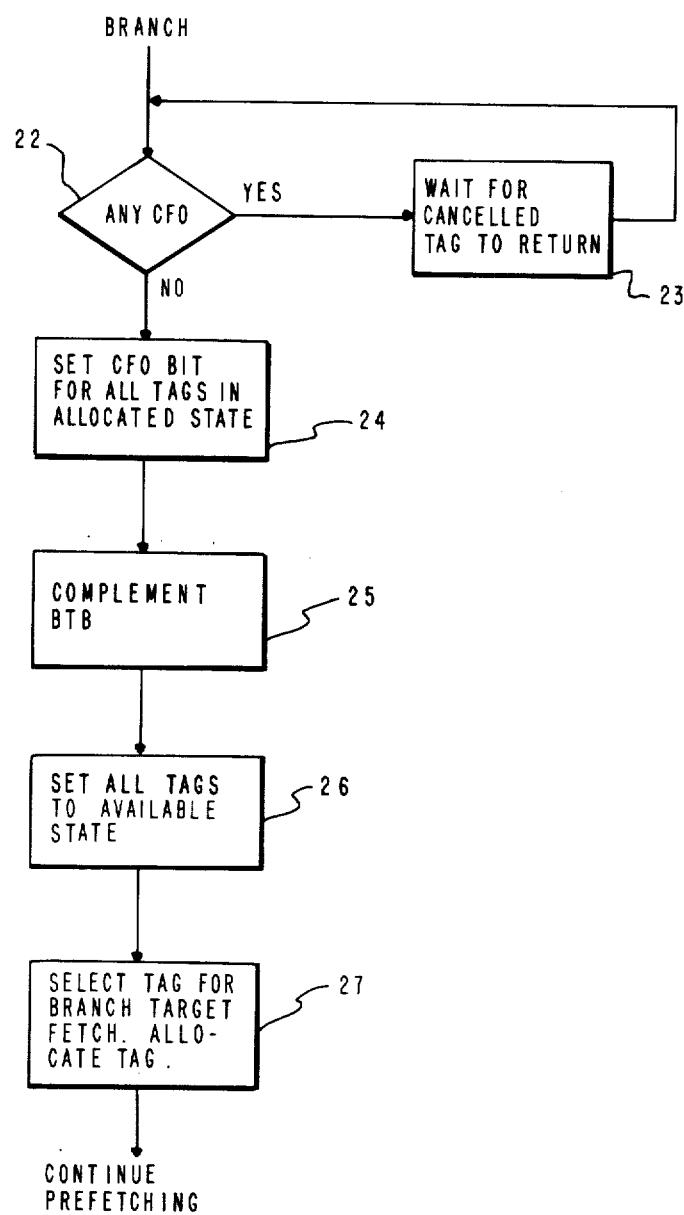
FIG. 2 is a flow chart depicting the branching operation according to the present invention.

The flow chart in FIG. 2 details the operation of IPB 11 at the time a branch in the instruction stream occurs. As indicated in box 22, a determination is made as to whether or not there are any cancelled fetches outstanding. If there are, then box 23 indicates that no further operation occurs until the cancelled tag identifying a returned prefetch instruction is sent from storage 14 to IPB 11. If there are no current fetches outstanding, then box 24 provides that control logic 21 sets a CFO bit for all registers 15 through 18 for which a prefetch has been allocated. Also at this time, the BTB value in BTR 19 is complemented as indicated in box 25 and all tags are set to their available state for enabling instructions to be fetched from storage as indicated in box 26. Finally in box 27, an identifying tag is selected in order to fetch the branch target instruction from storage 14. This prefetching process continues until all target fetches are completed.

Figure 3:
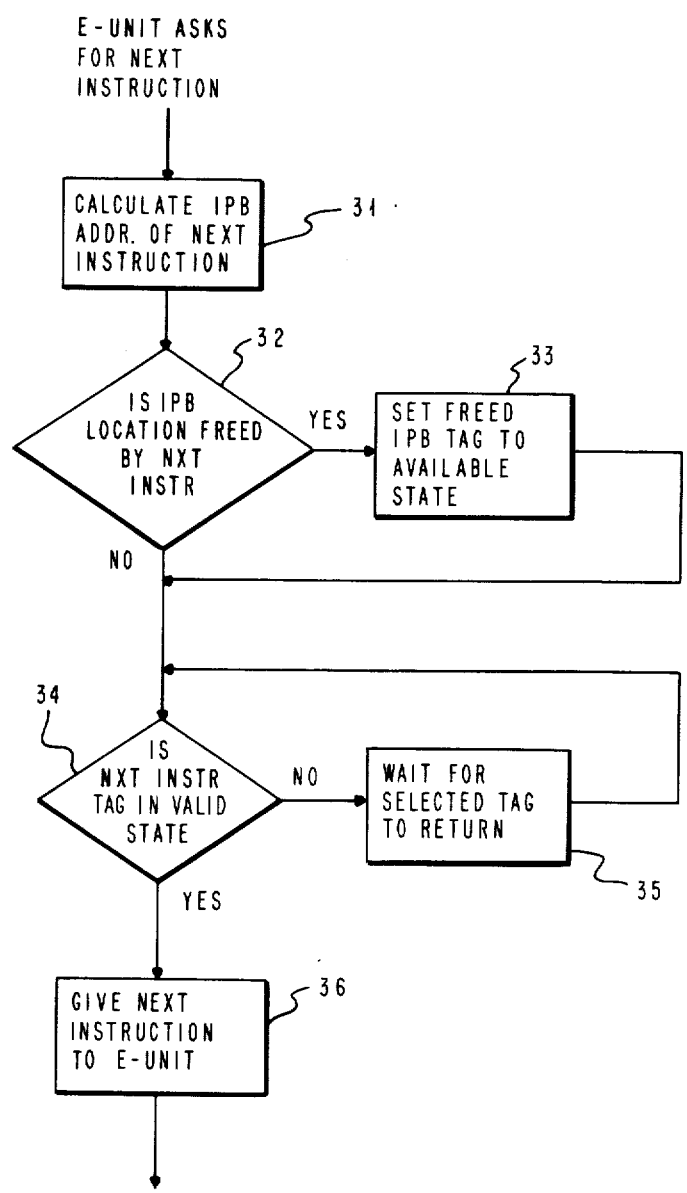
FIG. 3 is a flow chart depicting instruction execution according to the present invention.

The flow chart in FIG. 3 indicates the operation of IPB 11 when instruction execution unit 37 asks for the next instruction. As indicated in box 31, the next instruction address is calculated within IPB 11. Then in box 32, a decision is made as to whether or no the location in IPB 11 of the next instruction has been freed. If the answer is affirmative, then the freed IPB tag is set to its available state. However, if the answer is negative, then a further decision is made in block 34 as to whether or not the next instruction tag is in a valid state. If the next instruction tag is not in a valid state, then IPB 11 must wait for the selected tag to return from storage 14 over channel 12. However, if the next instruction tag is in a valid state, then the next instruction is provided to execution unit 37 for execution.

Figures 4, 5:
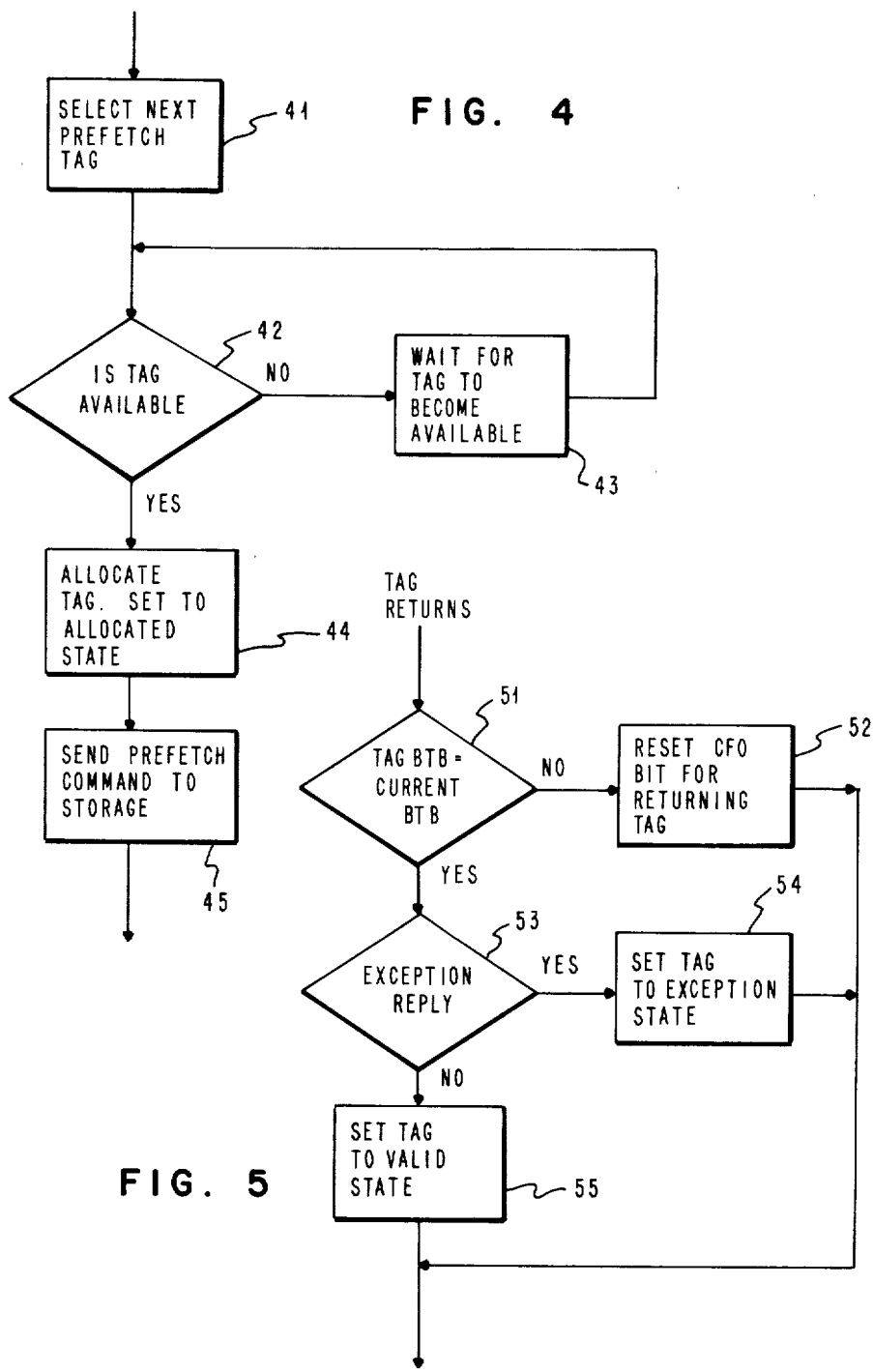
FIG. 4 is a flow chart depicting the prefetching operation of the present invention.
FIG. 5 is a flow chart depicting the returning tag operation of the present invention.

The process for selecting the next identifying tag for a prefetch is detailed in the flow chart shown in FIG. 4. After the next prefetch tag has been selected, a determination is made as to whether or not the tag is available. If such tag is not available, then IPB 11 must wait for such tag to become available as indicated in blocks 42 and 43. However, if the tag is available, then it is allocated to the next prefetch as shown in block 44. Finally the next prefetch along with identifying tag is sent to storage 14 so as to obtain the next instruction.

As shown in FIG. 5, when an instruction is returned from storage 14 with its associated identifying tag, a determination is made as to whether or not the BTB returning with the instruction is equal to the current BTB value in IPB 11. If the two values are not equal, then this is an indication that a branch has occurred in the instruction stream and consequently the prefetched instruction is no longer needed. The CFO bit for each returning tag is then reset. However, if the returning BTB value is equal to the current BTB value in IPB 11, then as stated previously this is an indication that a branch in the instruction stream has not occurred. A determination is then made as shown in block 53, as to whether or not a reply to an exception state exists. If the answer is affirmative then the tag identifier is set to the exception state, while if the answer is negative then the tag is set to the valid state and the instruction awaits execution.

One technique for decreasing performance degradation in IPB 11 due to branches is to introduce a set of branch-with-execute, also known as delayed branch, instructions. The branch-with-execute instructions are defined such that the next sequential instruction following the branch instruction, which is known as the subject instruction, is executed before the branch target instruction is executed. The subject instruction usually has already been fetched at the completion of the branch-with-execute instruction and consequently the processor 10 executes it. A branch-with-execute instruction sequence is shown in FIG. 6. In cycle 61, the instruction immediately preceding the branch-with-execute is being fetched and decoded, while in cycle 62 this instruction is being executed. Simultaneously in cycle 62, the branch-with-execute instruction is being fetched and decoded. In cycle 63 the subject instruction is being fetched and decoded while the branch-with-execute instruction is being executed. Likewise in cycle 64, the target instruction is being fetched and decoded while the subject instruction is executed. This simultaneous fetching and execution operation continues in cycles 65 and 66 as the target instruction and the instruction immediately following the target instruction are decoded and executed. In FIG. 6, the instruction fetch and decode time is assumed to be equal to the execution time. In many instances, it is more economical to use slower interleaved storage, and to use prefetch instructions further in advance. Such an operation is shown in FIG. 7.

The prefetching technique shown in FIG. 7 requires that IPB 11 contains at least four instructions since this is the number of prefetches required to support the execution of one instruction every cycle. Since processor 10 may not be able to execute an instruction immediately after the prefetch has been completed, one buffer location is required to hold each prefetch. In the preferred embodiment disclosed herein, IPB 11 contains four 32 bit registers 15 through 18 which may contain up to eight instructions each.

Figure 8:
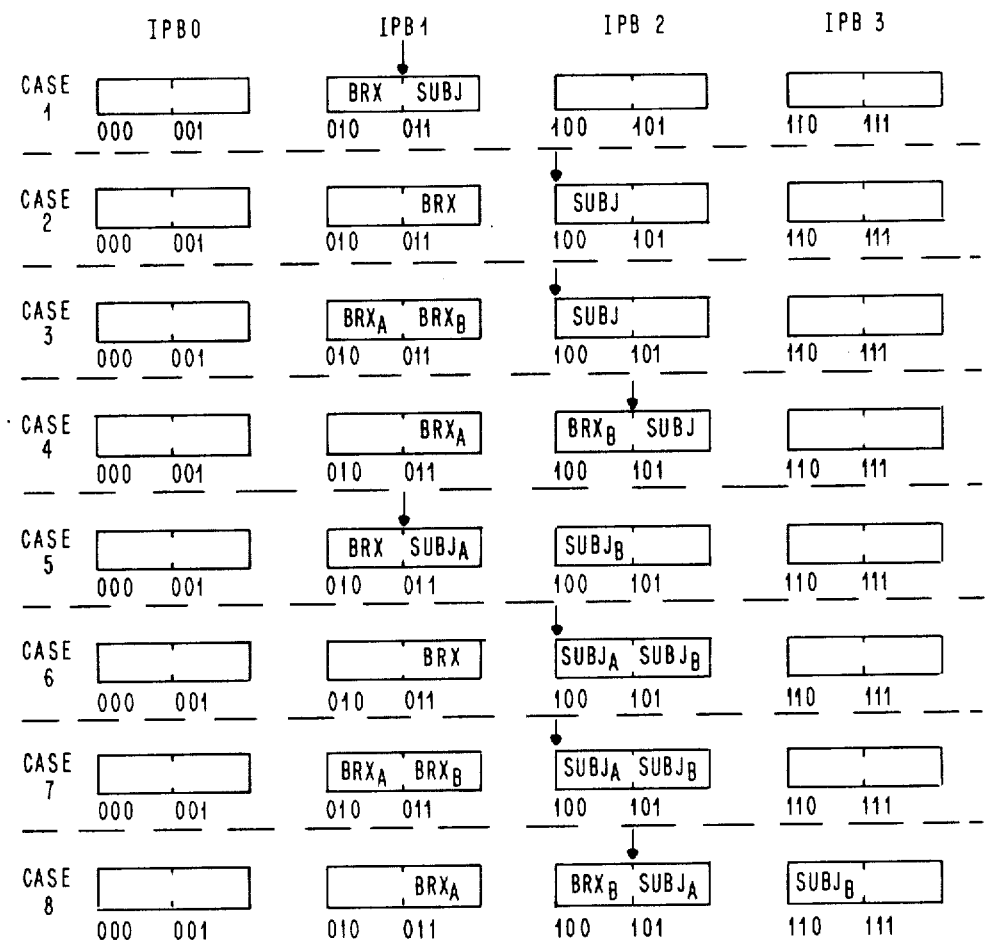
FIG. 8 is a diagram showing eight possible states of the instruction prefetch buffer at the beginning of a branch-with-execute.

FIG. 8 depicts the eight possible branch-with-execute cases which can exist based on the branch-with-execute instruction length, the subject instruction length, and address alignment. In each of these eight cases, there is located a branch-with-execute instruction and a subject instruction in one or more of registers 15 through 18. It is to be noted that registers 15 through 18 are organized as a circular queue so that these eight cases could exist with the branch-with-execute instruction (BRX) and could begin in any one of registers 15 through 18. Each arrow shown in FIG. 8 represents a pointer which can have one of eight binary values, 0 through 7. These pointers indicate the beginning of the next instruction to be executed. The pointers in FIG. 8 are set as they would be on the first cycle of the branch-with-execute instruction, i.e., immediately after the branch-with-execute instruction and immediately before the execution of the subject instruction.

When the branch-with-execute instruction is executed, IPB 11 determines the location within IPB 11 which is to be the destination of the branch target fetch. IPB 11 also allocates that location and determines whether or not the fetch of the subject instruction has begun. If such fetch has not begun, then the branch-with-execute instruction is held off. Finally, IPB 11 frees all locations therein not associated with the subject instruction and retains the pointer to the subject instruction. After the subject instruction has begun execution, IPB 11 frees those locations associated with the subject instruction so that they may be used for prefetching and also updates the IPB pointer to point to the target instruction.

Figure 9:
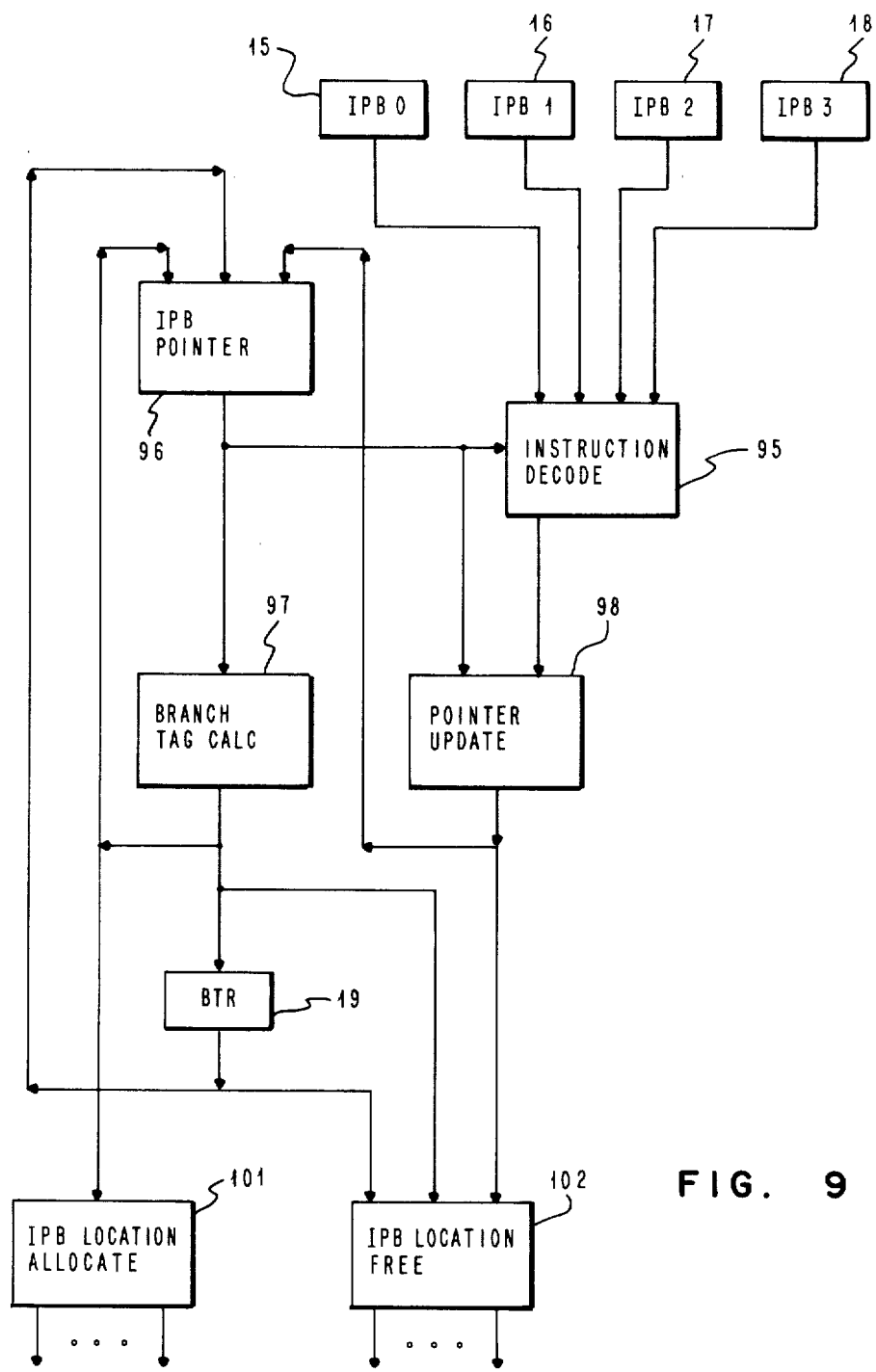
FIG. 9 is a block diagram depicting the operation of an instruction prefetch buffer according to the present invention.

The operation of IPB 11 with respect to the execution of a branch-with-execute instruction is explained with reference to FIG. 9. A branch-with-execute instruction may encounter any hold off condition encountered by a normal branch instruction. Thus, a branch-with-execute instruction may be held off because a cancelled fetch outstanding (CFO) bit is set for any location in IPB 11 indicating that a prefetch, cancelled because of a branch, has still not been received from storage 14. Additionally, a hold off may occur in a branch-with-execute instruction whenever the prefetch for all or part of the subject instruction has not yet been initiated when the branch-with-execute begins execution. To detect this condition, IPB 11 inspects the state of the locations in IPB 11 associated with the IPB pointer and with the IPB pointer incremented by a value of one. If either of these locations is free, i.e., available for prefetching, then the branch-with-execute is held off.

Assuming that the branch-with-execute is not held off, then the value of the IPB pointer is incremented by a value of three. This is done using logic blocks 96 and 98. The location in IPB 11 associated with this value is guaranteed not to contain any part of the subject instruction due to the incrementation of such value by three. The low order bit of this calculated value is then replaced by the next to low order bit of the branch target address. The resulting value is the IPB pointer used to decode the target instruction. If the complete subject instruction has not yet been received from storage 14 when the branch-with-execute instruction executes, then the new IPB pointer value for the target instruction is stored in BTR 19. At this time, the IPB location indicated by incrementing the IPB pointer by three is then allocated in IPB 11 for the branch target fetch. This is shown in block 101. As indicated in block 102, all locations in IPB 11 except the location previously allocated and the locations associated with the current IPB pointer and the current IPB pointer plus one are freed. The location allocated previously cannot be freed because it is needed for the branch target fetch. The locations associated with the current IPB pointer and the current IPB pointer plus one may hold the subject instruction and thus they cannot be freed. The CFO bit for the location in IPB 11 previously allocated and the locations previously freed are then set. This indication is set for each location that is already allocated when it is either allocated or freed so as to mark the outstanding prefetch to that location as invalid. Note that the subject instruction locations are not effected here because any outstanding subject instruction prefetches are still valid.

The logic in block 95 performs the function of decoding the subject instruction. This decoding operation is complete when all parts of the subject instruction have been properly received from registers 15 through 18. At this time, IPB pointer 96 is loaded with the contents of BTR 19. This latter step prepared IPB 11 to decode the target instruction when it is received from storage 14. Finally, the location in IPB 11 associated with the BTR 19 value decremented by two is then freed by the logic in block 102. This procedure frees a location which may not have already been freed either due to the branch or to the decoding of the subject instruction. By following the above procedure, a branch-with-execute is implemented without cancelling all of the fetches of previous instructions prior to a branch. By cancelling all but one of these instructions and executing this one instruction, regardless of the branch, processor 10 is kept busy during any communications with storage 14 which are required as a result of the branch. The execution of this one instruction can significantly increase the efficiency of operation of pipelined processor 10 with respect to IPB 11.

Although the description of the invention provided herein has been primarily directed to a preferred embodiment and to a variation in that preferred embodiment in order to clearly demonstrate the basic principles of the invention, it is to be understood that many modifications and variations in the structure and operation of the invention are possible without departing from the spirit and the scope of the invention.

What is claimed is:

1. In a processing system including a processor for fetching and executing a pluarlity of instructions having at least one branch instruction, and a storage from which said processor fetches the instructions, said processor comprising:

means for generating control tags each of whose current value is changed when a branch instruction is executed;

means connected to said generating means for appending one of said control tags to a request from a sending means before said request is sent to said storage by combining said request with said control tag;

said sending means connected to said appending means for sending said request for instructions to said storage with said control tag;

means connected to said storage for receiving requests with said control tags and instructions from said storage;

means connected to said generating and recieving means, for determining if the control tag of the request for a received instruction is equal to the current value of the control tag in said generating means; and means connected to said determining and receiving means, for retaining each instruction received from said storage only if the control tag of the request for the received instruction is equal to the current value of the control tag in said generating means.

2. A processor according to claim 1 wherein said means for retaining includes an instruction fetch buffer having a plurality of separately identifiable registers.

3. A processor according to claim 2 further including means connected to said instruction fetch buffer for appending a number to each request, before said request is sent to said storage by combining the number with the request, for the instruction identifying to which one of said plurality of registers each instruction received is to be sent.

4. A processor according to claim 2 further including means connected to the sending means and to each of said pluarlity of separately identifiable registers for setting a control bit for one of said registers each time a request for instruction is sent to said storage for that register.

5. A processor according to claim 4 wherein said control bit setting means further includes means connected to said retaining means, for resetting said control bit for each of said register each time a received instruction control tag for a received instruction for that register is unequal to the current value of the control tag in said generating means, thereby indicating that a branch instruction has been reached.

6. A processor according to claim 5 further including means connected to said instruction fetch buffer for delaying execution of said branch instruction until said control bit has been reset.

7. In a processing system including a processor and a storage from which said processor fetches instructions, a method for fetching and executing a plurality of instructions having at least one branch instruction, said method comprising the steps of:

generating control tags each of whose current value is changed when a branch instruction is executed;

appending one of said control tags to each request sent to said storage before said request is sent to said storage by combining said control tag with said request;

sending requests for instructions to said storage with said control tags;

receiving said instructions from said storage with said requests and control tags;

determining if the control tag of the request for a received instruction is equal to the current valve of the control tags; and retaining each instruction received from storage if the control tag of the request for the received instruction is equal to the current value of the control tag.

8. A method according to claim 7 further comprising the step of appending a number to each request for instruction identifying a register to which each received instruction is to be sent.

9. A method according to claim 7 further comprising the step of setting a control bit for one of said registers each time a request for instruction is sent to said storage for that register.

10. A method according to claim 9 further comprising the step of resetting said control bit for one of said registers each time a received instruction control tag for a received instruction for that register is unequal to the current value of the control tag.

* * * * *